United States Patent [19]

Matsuura et al.

[11] 4,339,187

[45] Jul. 13, 1982

[54] PHOTOGRAPHING APPARATUS

[75] Inventors: Tsuyoshi Matsuura, Ina; Mamoru Aihara, Hachioji; Yutaka Takahashi, Hachioji; Yoshio Nakajima, Hachioji, all of Japan

[73] Assignee: Olympus Optical Company Ltd., Tokyo, Japan

[21] Appl. No.: 193,623

[22] Filed: Oct. 3, 1980

[30] Foreign Application Priority Data

Oct. 26, 1979 [JP] Japan .............................. 54/137741

[51] Int. Cl.³ .............................................. G03B 1/18
[52] U.S. Cl. ...................................... 354/173; 354/79
[58] Field of Search ...................... 354/170, 171, 173

[56] References Cited

U.S. PATENT DOCUMENTS

| 3,987,463 | 10/1976 | Nishikawa et al. | 354/173 |
| 4,015,198 | 3/1977 | Iwashita et al. | 354/173 |
| 4,086,603 | 4/1978 | Kozuki et al. | 354/173 |
| 4,175,845 | 11/1979 | Iwashita et al. | 354/173 |
| 4,182,562 | 1/1980 | Iwashita et al. | 354/173 |

Primary Examiner—Russell E. Adams
Attorney, Agent, or Firm—Weinstein & Sutton

[57] ABSTRACT

A photographing apparatus detects whether a film winding assembly mounted utilizes an automatic or a manual film winding mechanism. The apparatus includes detecting means in the form of a diode across which a voltage is developed in response to a current flow through a film winding motor of the automatic film winding mechanism. The voltage developed across the diode permits a discrimination whether the film winding assembly mounted utilizes an automatic or a manual film winding mechanism.

5 Claims, 4 Drawing Figures

FIG. 1
FIG. 2
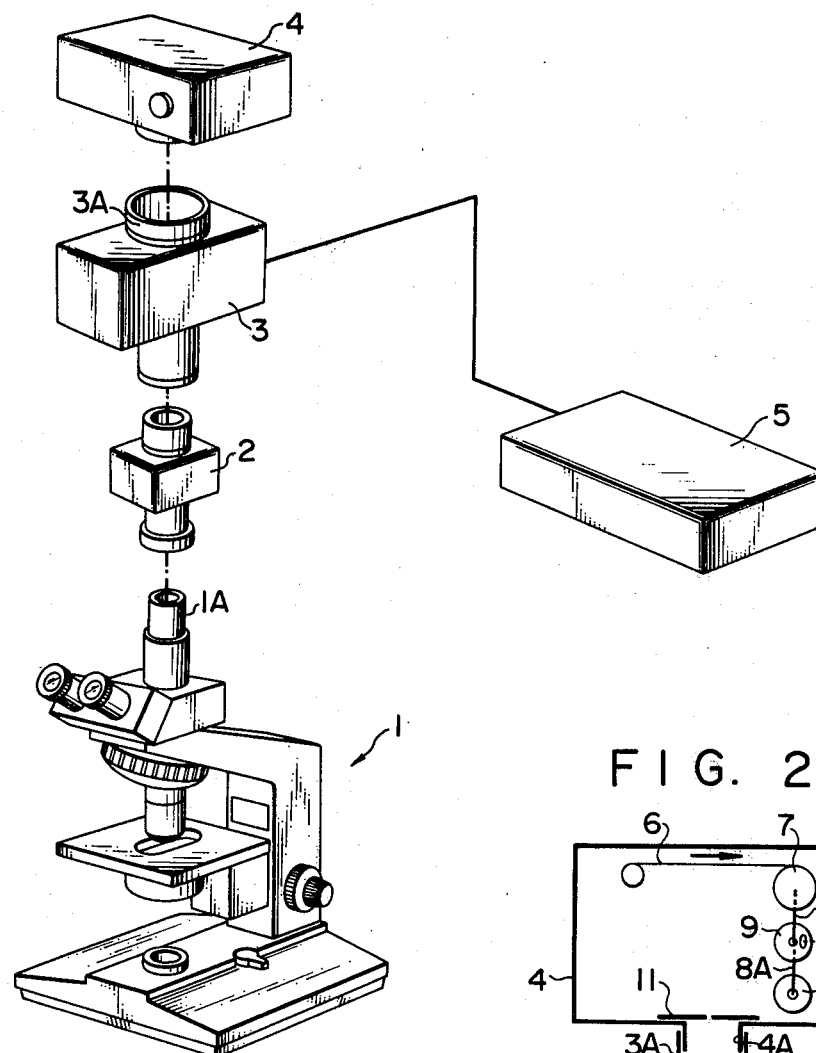
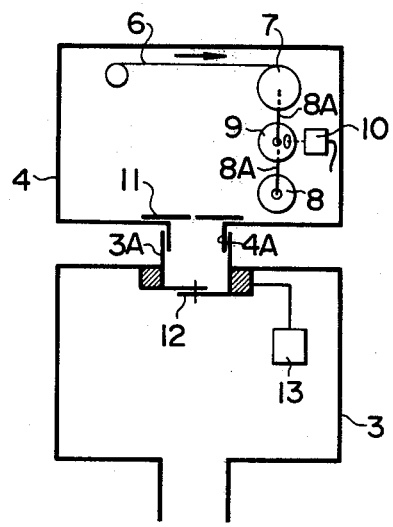

PHOTOGRAPHING APPARATUS

BACKGROUND OF THE INVENTION

The invention relates to a photographing apparatus, and more particularly, to a photographing apparatus on which either an automatic or a manual film winding mechanism may be mounted.

In a known photographing apparatus for use with microscopes in which either an automatic or a manual film winding mechanism can be mounted, it is necessary to discern the type of film winding mechanism, either automatic or manual, which is mounted on the photographing apparatus. By way of example, when a film winding assembly is mounted which utilizes an automatic film winding mechanism, there is provided means for detecting a film end, thereby preventing a shutter release from occurring whenever the film end is detected. Such detection means may comprise a rotary disc connected with a motor shaft associated with the film winding mechanism and having a notch formed therein so that the angular position of the notch may be detected by a mechanical arm to thereby operate a switch. In such an arrangement, a length of the film corresponding to one frame is wound up during one revolution of the motor shaft. Assuming that the arm moves into the notch to turn the switch off after one frame of the film has been wound up, the motor will be energized for a given time interval in response to a next wind-up command signal, whereby the arm will be moved out of the notch to turn the switch on. When the motor has substantially completed one revolution, the arm will again move into the notch to turn the switch off. As long as the switch is turned on and off in a sequential manner (off-on-off), there is an available length of the film, enabling a subsequent film winding operation. The film end will be reached principally in two manners. First, the available length of the film may have been precisely exhausted during a previous winding operation. In this instance, the motor shaft cannot rotate even though the motor is energized, and hence the switch remains off. Alternatively, if the film end is reached during the course of a film winding operation, the switch remains on. The condition that the switch remains off or on can be detected as an indication of the fact that the film end is reached, thereby inhibiting a subsequent photographing operation or issuing an alarm to the user. However, it is possible, though with a very low probability, that a very small length of the film remains available at the termination of a previous film winding operation, and hence the rotary disc is permitted to rotate through a small angle, whereupon the arm is driven out of the notch. However, when the motor is deenergized, the rotary disc will reverse slightly by reaction, whereby the arm is again allowed to move into the notch. In this instance, the switch will cycle through off-on-off, making it difficult to distinguish such operation from a normal film winding operation. This may cause malfunctioning of the arrangement.

When a winding assembly which utilizes a manual film winding mechanism is mounted on the photographing apparatus, there is no provision of the motor and the detecting means which detect the angular position, both mentioned above. As a result, a signal, which is equivalent to the switch output maintained at off level, is supplied to a decision circuit, which may inadvertently light a film end warning lamp or disables a second and subsequent release operation even though an initial release operation is enabled. These difficulties can be avoided by providing a changeover switch on an operating panel of the control box which assumes positions corresponding to an automatic and a manual film winding operation. However, with this arrangement, it is necessary that a user operate the switch every time the type of the film winding assembly used is changed from a previous one, adding troublesome work. In addition, the operation of the changeover switch may inadvertently be forgotten, missing a chance to take a picture. This will be of a greater significance when taking a picture with a microscope. In particular, a microscope requires a number of operations, which may increase the likelihood that the operation of the changeover switch may be forgotten.

SUMMARY OF THE INVENTION

It is an object of the invention to eliminate the above disadvantages of the prior art, by providing a photographing apparatus including means which detects whether an automatic or a manual film winding mechanism is adopted in a film winding assembly which has been mounted thereon.

According to the invention, the detecting means senses whether an automatic or a manual film winding mechanism is adopted in the film winding assembly, and produces a corresponding signal. This signal controls the film winding operation as well as a shutter release operation. In this manner, these operations can be properly performed for either type of film winding mechanism used in the film winding assembly.

BRIEF DESCRIPTION OF THE DRAWINGS

FIG. 1 is an exploded, perspective view of a photographing apparatus according to one embodiment of the invention;

FIG. 2 is a diagrammatic view of a film winding assembly and an automatic exposure unit of the photographing apparatus shown in FIG. 1, which are connected together;

DESCRIPTION OF PREFERRED EMBODIMENT

Figure 3:
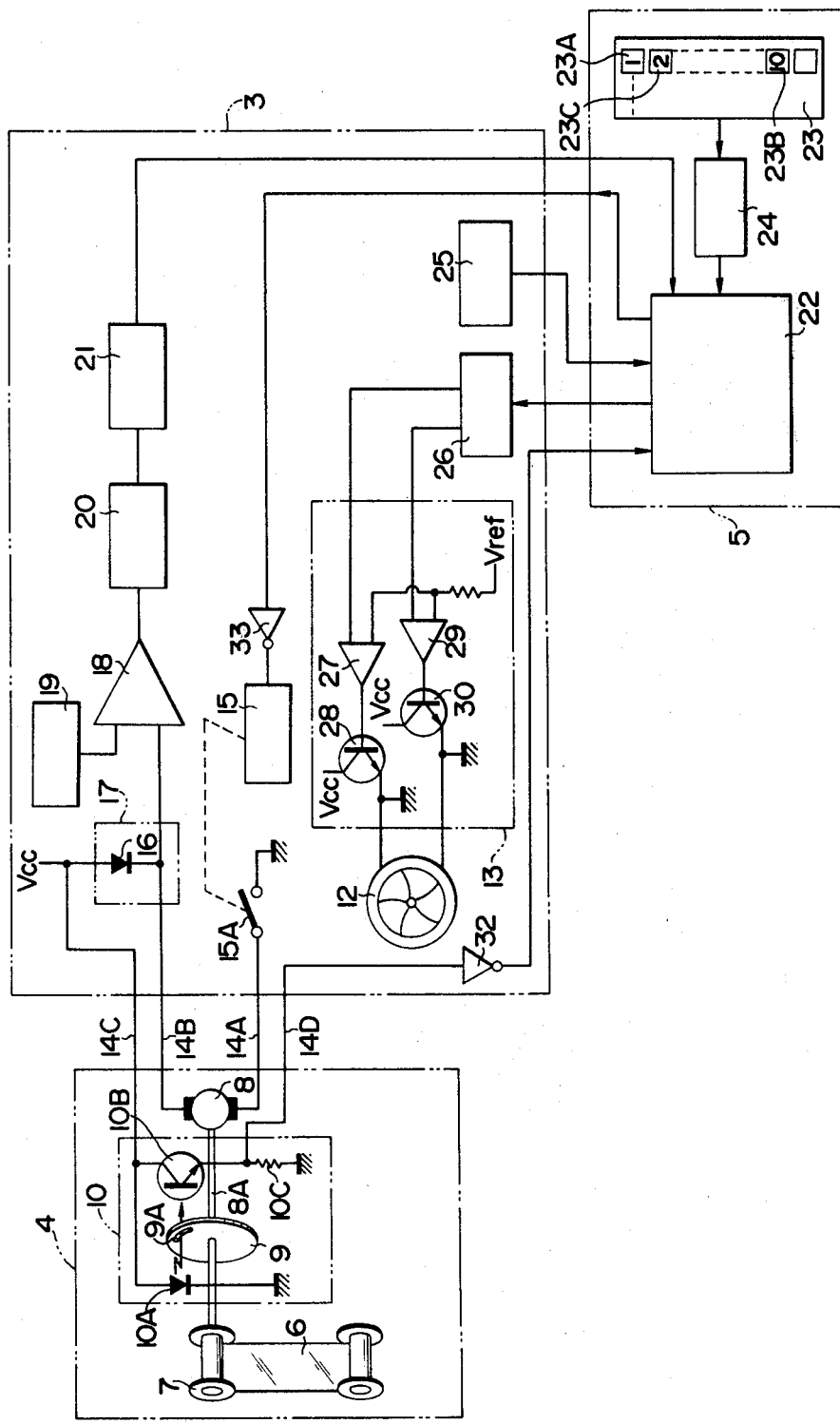
FIG. 3 is a circuit diagram of the photographing apparatus shown in FIG. 1.

Referring to FIG. 1, there is shown a photographing apparatus according to the invention and comprising an adaptor 2 which is detachably connected to a coupling sleeve 1A of a microscope 1, an automatic exposure unit 3 which is detachably connected to the adaptor 2, a film winding assembly 4 interchangeably mounted on the automatic exposure unit 3, and a controller 5 connected to the automatic exposure unit 3. The purpose of the adaptor 2 is merely to provide a coupling between the automatic exposure unit 3 and the coupling sleeve 1A of the microscope 1. The automatic exposure unit 3 includes a photometric circuit for determining an exposure period, a shutter, and a shutter drive circuit. The shutter operation in the automatic exposure unit 3 is controlled by the controller 5. The automatic exposure unit 3 includes a socket 3A in which a film winding assembly may be detachably mounted. The assembly may utilize either an automatic film winding mechanism in which a film is automatically wound by a drive from a motor or a manual film winding mechanism, thus enabling an automatic or manual film winding by the film winding assembly mounted thereon.

FIG. 2 diagrammatically illustrates the connection between the automatic exposure unit 3 and the film winding assembly 4 which utilizes an automatic film winding mechanism. The assembly 4 includes a motor 8 connected to a film winding mechanism 7, which is adapted to wind up a film 6, a rotary disc 9 connected with the drive shaft 8A of the motor 8, a position detector 10 for detecting the angular position of the rotary disc 9, and a light shield 11. The light shield 11 is adapted to be automatically opened whenever the coupling sleeve 4A of the assembly 4 is connected to the socket defined by the coupling sleeve 3A of the automatic exposure unit 3, and to be closed automatically whenever these units are disconnected from each other. The automatic exposure unit 3 includes an electromagnetic shutter 12 and an associated drive circuit 13. When the coupling sleeve 4A of the assembly 4 is connected to the coupling sleeve 3A of the automatic exposure unit 3, an electrical interconnection (not shown) is automatically achieved between the assembly 4 and the unit 3.

FIG. 3 shows the electrical circuit of the film winding assembly 4, the automatic exposure unit 3 and the controller 5 shown in FIGS. 1 and 2.

As mentioned previously, the assembly 4 includes the motor 8 having its drive shaft 8A connected to the film winding mechanism 7, the rotary disc 9 fixedly mounted on the drive shaft 8A, and the detector 10 which detects the angular position of the rotary disc 9 without contacting the latter. The rotary disc 9 is defined by a disc-shaped light shield having a transparent portion 9A formed along part of its periphery. The detector 10 includes a light emitting element 10A such as light emitting diode which emits light for passage through the transparent portion 9A formed in the disc 9, and a light receiver 10B formed by a photoelectric transducer element such as phototransistor which develops an electrical signal in response to light input from the light emitting element 10A which is received through the transparent portion 9A. The motor 8 is connected to the automatic exposure unit 3 through lead wires 14A, 14B. The lead wire 14B is connected inside the exposure unit 3 to a power supply Vcc through a diode 16 of a detector circuit 17 while the other lead wire 14A is connected to the ground through a relay contact 15A. The anode of the light emitting diode 10A is connected to the collector of the phototransistor 10B, and thence connected to the power supply Vcc of the exposure unit 3 through a lead wire 14C. The cathode of the light emitting diode 10A is connected to the ground, and the emitter of the phototransistor 10B is also connected to the ground through resistor 10C. The junction between the emitter of the phototransistor and the resistor 10C is connected to an inverter 32 disposed within the exposure unit 3 through a lead wire 14D.

The automatic exposure unit 3 includes the detector 17 having the diode 16 which has its cathode connected to the motor 8 through the lead wire 14B and its anode connected to the power supply Vcc. A comparison circuit 18 includes one input to which the cathode of the diode 16 is connected and another input which is connected to a source of reference voltage 19. A one-shot multivibrator 20 is triggered by an output signal from the comparison circuit 18, and produces an output signal which drives a photocoupler 21. In addition, the automatic exposure unit includes a photometric circuit 25 which determines light from an object being determined to determine a proper exposure period. An output signal from an exposure control circuit 26 is fed to the shutter drive circuit 13, which in turn operates the electromagnetic shutter 12. The inverter 32 has its input connected to the emitter of the phototransistor 10B in the film winding assembly 4. A relay 15 includes the relay contact 15A mentioned above, and is driven by an inverter 33.

The shutter drive circuit 13 includes a pair of operational amplifiers 27, 29 which receive a shutter open signal and a shutter close signal, respectively, from the exposure control circuit 26. The respective output signals of these operational amplifiers are fed to the base of transistors 28, 30, which in turn control the opening and closing operation of the electromagnetic shutter 12.

The controller 5 includes an operating button assembly 23 which includes an automatic photographing button 23A which enables a continuous photographing operation to be achieved whenever the film winding assembly 4 utilizing an automatic film winding mechanism is mounted, an intermittent automatic photographing button 23B which is operated to enable an intermittent automatic photographing operation, and a release button 23C which may be operated to initiate shutter release operation whenever the film winding assembly utilizing a manual film winding mechanism is mounted. In addition, the controller includes an interface circuit 24 which receives signals from the assembly 23 and converts them into corresponding signals which are compatible with the next following stage, and also includes a computer 22 which controls the automatic exposure unit 3 in accordance with signals supplied from the interface circuit 24. Specifically, the computer 22 receives an output signal from the photocoupler 21 of the exposure unit 3, an output signal from the photometric circuit 25 which represents a proper exposure period, and an output signal from the inverter 32, and produces a shutter open/close signal which is supplied to the exposure control circuit 26 and also supplies a motor drive signal to the inverter 33 to thereby operate the relay 15.

In operation, when the film winding assembly 4 mounted utilizes an automatic film winding mechanism, the automatic photographing button 23A may be operated to feed a signal to the computer 22 through the interface circuit 24. In response thereto, the computer 22 delivers a motor drive signal to the inverter 33 of the automatic exposure unit 3, thus operating the relay 15 to close its contact 15A. Thereupon, a path for a current flow through the motor 8 is completed from the power supply Vcc through the diode 16 and the contact 15A. Accordingly, the motor 8 is set in motion. In addition, a current flow through the diode 16 develops a voltage thereacross which depends on its current-voltage response. The presence of the voltage indicates that the film winding assembly 4 utilizing an automatic film winding mechanism which includes the motor 8 has been mounted. If the film winding assembly utilizing a manual film winding mechanism which does not include a motor is mounted, the voltage cannot be developed. Thus, the presence or absence of the voltage permits a discrimination whether the film winding assembly mounted utilizes an automatic or a manual film winding mechanism. The voltage is supplied to one input of the comparison circuit 18 for comparison against the reference voltage from the source 19 which is supplied to the other input thereof. When this voltage is less than the reference voltage, a normal output signal is produced to trigger the one-shot multivibrator 20. The multivibrator 20 may be formed by a conventional one-shot multivibrator which produces an output pulse for a given duration or a monostable multivibrator. The purpose of the multivibrator is to prevent a malfunctioning from occurring in response to chattering of the relay contact 15A or brush noises from the motor 8 whenever the latter is started. An output pulse from the multivibrator 20 has a duration which is greater than the time period required for one revolution of the motor 8 and which is less than the minimum time interval between successive film winding operations. Thus it shapes a discontinuous output signal from the comparison circuit 18 which may result from the chattering of the relay contact 15A and brush noises from the motor 8 to minimize their influences.

The output signal from the one-shot multivibrator 20 is supplied to the photocoupler 21, and thence applied to the computer 22 in the controller 5. The photocoupler 21 provides an electrical isolation between the one-shot multivibrator 20 of the automatic exposure unit 3 and the controller 5, thus preventing the electrical processing of the detection signal from being influenced by noises from the motor 8 by allowing the use of a power supply for the electrical processing circuit subsequent to the photocoupler 21 which is separate from the power supply Vcc for the motor 8.

When a detection signal indicative of the use of an automatic film winding mechanism in the film winding assembly 4 mounted is applied to the computer 22, the latter responds thereto by producing an automatic film winding signal to enable a continuous photographing operation in response to a signal from the automatic photographing button 23A which is supplied through the interface circuit 24. Thus, the rotation of the motor 8 drives the winding mechanism 7 through the drive shaft 8A, whereby the film 6 is wound up. In addition, the transmission of light from the element 10A to the light receiver 10B through the transparent portion 9A formed in the rotary disc 9 triggers the light receiver 10B into operation, and the resulting output signal is fed to the computer 22 through the lead wire 14D and the inverter 32. It is to be understood that the transparent portion 9A is located intermediate the adjacent frames of the film 6. The arrangement is such that one revolution of the motor 8 is effective to wind up a length of the film 6 corresponding to one frame. A film wound signal is formed by the light passing through the transparent portion 9A, and is fed to the computer 22 through the lead wire 14D and the inverter 32. In this manner, the fact that one frame of the film 6 has been wound up is supplied to the computer 22, which then turns off the motor drive signal which has been supplied to the inverter 33 off. Consequently, the relay 15 is deenergized to open the contact 15A, whereby the motor 8 is deenergized and comes to a stop. When an object to be photographed is determined while the motor 8 is at rest, the computer 22 produces a shutter open signal, which is fed through the exposure control circuit 26 and the operational amplifier 27 to render the transistor 28 conductive, thus initiating a shutter opening operation. At the same time as the shutter 12 opens, the photometric circuit 25 is activated to determine a proper exposure period, which is supplied to the computer 22. After the lapse of the shutter period, the computer 22 produces a shutter close signal which is supplied through the exposure control circuit 26 to the shutter drive circuit 13. The close signal is fed through the operational amplifier 29 to render the transistor 30 conductive, thus closing the shutter 12. Subsequently, the computer 22 again delivers a motor drive signal to the inverter 33 to energize the relay 15, thus driving the motor 8 to perform an automatic film winding operation again. As the motor circuit is closed, the voltage developed across the diode 16 is again fed to the comparison circuit 18 and thence through the one-shot multivibrator 20 and the photocoupler 21 to the computer 22. In this manner, the fact that the film winding assembly utilizing an automatic film winding mechanism is mounted is supplied to the computer. Subsequently, the above operation is repeated, thus achieving a continuous automatic film winding operation.

In the above description, the automatic photographing button 23A has been operated to perform a continuous automatic film winding operation. Instead, the intermittent automatic photographing button 23B may be operated. In this instance, the film winding as well as the shutter opening and closing operation are automatically controlled by the computer 22 in the same manner as mentioned above. However, in this instance, the film winding and the photographing operation take place intermittently, for example, once for an interval of from two to ten minutes, for example, rather than continuously. The time interval is controlled by the computer 22. In other respects, the operation of the circuit shown in FIG. 3 is similar to what has been described above.

It is then assumed that the film winding assembly mounted utilizes a manual film winding mechanism. Since a manual film winding mechanism does not include a motor such as the motor 8, there can be developed no voltage across the diode 16. Accordingly, no detection signal is applied to the computer 22, and the absence of such a signal is recognized by the computer 22 as indicating the fact that the film winding assembly utilizing a manual film winding mechanism has been mounted. In this instance, the film winding operation and the shutter release operation are subject to a manual control.

Figure 4:
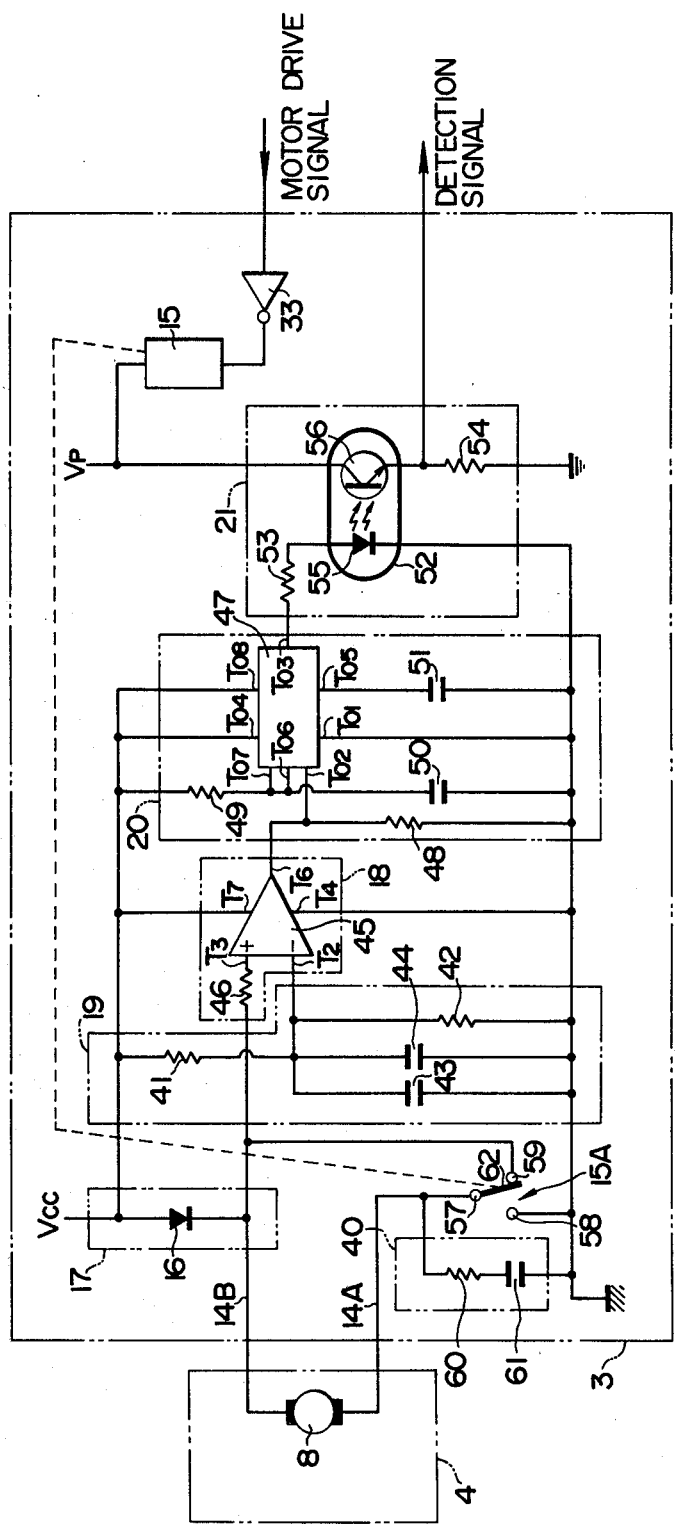
FIG. 4 is a more detailed circuit diagram of part of the automatic exposure unit shown in FIG. 3.

FIG. 4 shows the detail of the circuit arrangement of the detector 17, the comparison circuit 18, the source 19 of reference voltage, the one-shot multivibrator 20 and the photocoupler 21.

Referring to FIG. 4, it should be initially noted that the film winding assembly 4 is indicated by the motor 8 alone. In addition to the comparison mentioned above, the inverter 33, the relay 15, the relay contact 15A and relay contact protective circuit 40 are specifically shown.

The detector 17 is formed by the diode 16 which has its anode connected to the power supply Vcc and its cathode connected to the lead wire 14B. The source 19 of reference voltage comprises a pair of resistor 41, 42 connected in series across the power supply Vcc and the ground, and a pair of capacitors 43, 44 are connected in parallel relationship with each other across the resistor 42. The reference voltage is derived at the junction between resistors 41, 42. The comparison circuit 18 comprises an operational amplifier 45 and a resistor 46. It includes one input T2 which is connected to the junction between the resistors 41, 42 and another input T3 which is connected through the resistor 46 to the cathode of the diode 16. In addition, it includes a further terminal T4 which is connected to the ground, and still another terminal T7 which is connected to the power supply Vcc. The one-shot multivibrator 20 comprises an integrated circuit 47 which functions as a one-shot multivibrator, a resistor 48 connected across the output terminal T6 of the operational amplifier 45 and the ground, a series combination of resistor 49 and capacitor 50 connected across the power supply Vcc and the ground, and another capacitor 51 connected between a terminal T05 of the integrated circuit 47 and the ground. The integrated circuit 47 includes a connection terminal T02 which is connected to the output terminal T6 of the operational amplifier 45, a connection terminal T01 which is connected to the ground, connection terminals T04 and T08 which are connected to the power supply Vcc, and connection terminals T06 and T07 which are connected to the junction between the series connected resistor 49 and capacitor 50. The photocoupler 41 comprises a photocoupler element 52 including a light emitting diode 55 and a phototransistor 56, a resistor 53 connected across the anode of the diode 55 and the output terminal T03 of the integrated circuit 47, and another resistor 54 connected across the emitter of the phototransistor 56 and the ground. The cathode of the diode 55 is connected to the ground while the collector of the phototransistor 56 is connected to a separate power supply Vp. The relay 15 is adapted to be energized by the power supply Vp through the inverter 33 which is activated by the motor drive signal delivered from the controller 5. The relay contact 15A is formed as a transfer contact including a switching terminal 57 which is connected through the lead wire 14A to the motor 8, a first fixed terminal 58 connected to the ground and a second fixed terminal 59 which is connected to the cathode of the diode 16. The contact protective circuit 40 is formed by a series circuit of a resistor 60 and capacitor 61 connected across the switching terminal 57 and first fixed terminal 58.

In operation, the inverter 33 is energized by the motor drive signal from the controller 5 to energize the relay 15, whereupon a movable contact 62 is thrown to the first fixed terminal 58. The motor 8 is then energized through a path extending from the power supply Vcc and including the diode 16, lead wire 14B, motor 8, lead wire 14A and contact 15A to the ground. A voltage is then developed across the diode 16, and is fed through the resistor 46 to the input T3 of the operational amplifier 45 while the reference voltage is applied to the other input T2. When the voltage across the diode is found to be less than the reference voltage as a result of the comparison, an output signal is produced to trigger the one-shot multivibrator 20, the output signal of which is supplied to the photocoupler 21. It is to be noted that the photocoupler 21 is a split construction in that the light emitting diode 55 which receives the output signal from the multivibrator is physically separate from the phototransistor 56 which receives the light from the diode 55 to produce an output signal. In this manner, noises produced by the motor 8 are prevented from being transmitted to the phototransistor 56. As mentioned previously in connection with FIG. 3, the output signal from the phototransistor 56 is supplied to the computer 22 in the controller 5 as the detection signal.

What is claimed is:
1. A photographing apparatus comprising
   a receiver for receiving a film winding assembly which may be provided with either an automatic film winding mechanism which includes a motor to perform an automatic film winding operation or a manual film winding mechanism which permits a manual film winding operation;
   means for detecting the operative condition of the motor in the automatic film winding mechanism whenever a film winding assembly which is provided with the automatic film winding mechanism is mounted in the receiver; and
   means responsive to an output signal from the detecting means for producing an output signal to said motor for discriminating whether there is mounted a film winding assembly provided with the automatic film winding mechanism or a film winding assembly provided with the manual film winding mechanism.

2. A photographing apparatus according to claim 1 in which the detecting means comprises a detection circuit including a diode through which a motor current flows, the diode developing a voltage thereacross which corresponds to the motor current, and a comparison circuit for comparing the voltage developed across the diode against a reference voltage.

3. A photographing apparatus according to claim 2 in which the detecting means further comprises a one-shot multivibrator which is triggered by an output signal from the comparison circuit.

4. A photographing apparatus according to claim 3 in which the detecting means further includes a photocoupler which is energized by an output signal from the multivibrator.

5. A photographing apparatus according to claim 1 in which the discriminating means comprises a computer.

* * * * *